(12) United States Patent
Fang et al.

(10) Patent No.: US 12,303,832 B2
(45) Date of Patent: May 20, 2025

(54) METHOD FOR RECYCLING ELECTRONIC-GRADE AND INDUSTRIAL-GRADE SULFURIC ACID

(71) Applicant: SAR Technology Inc., Taipei (TW)

(72) Inventors: Hsu Chiang Fang, Tainan (TW); Mong-Tung Lee, Tainan (TW)

(73) Assignee: SAR TECHNOLOGY INC., Taipei (TW)

( * ) Notice: Subject to any disclaimer, the term of this patent is extended or adjusted under 35 U.S.C. 154(b) by 413 days.

(21) Appl. No.: 18/077,120

(22) Filed: Dec. 7, 2022

(65) Prior Publication Data

US 2024/0189772 A1 Jun. 13, 2024

(51) Int. Cl.
| | | |
|---|---|---|
| B01D 53/96 | (2006.01) | |
| B01D 53/00 | (2006.01) | |
| B01D 53/14 | (2006.01) | |
| B01D 53/50 | (2006.01) | |
| B01D 53/86 | (2006.01) | |
| B82Y 30/00 | (2011.01) | |

(52) U.S. Cl.
CPC ........... *B01D 53/96* (2013.01); *B01D 53/002* (2013.01); *B01D 53/1418* (2013.01); *B01D 53/1425* (2013.01); *B01D 53/1493* (2013.01); *B01D 53/507* (2013.01); *B01D 53/8671* (2013.01); *B82Y 30/00* (2013.01); *B01D 2255/104* (2013.01); *B01D 2255/106* (2013.01); *B01D 2255/802* (2013.01); *B01D 2257/80* (2013.01)

(58) Field of Classification Search
CPC .. B01D 53/96; B01D 53/002; B01D 53/1418; B01D 53/1425; B01D 53/1493; B01D 53/507; B01D 53/8671; B01D 2255/104; B01D 2255/106; B01D 2255/802; B01D 2257/80; B01D 2252/103; B01D 2255/20723; B01D 2256/00; B01D 2257/302; B01D 53/8609; B82Y 30/00
See application file for complete search history.

(56) References Cited

U.S. PATENT DOCUMENTS

| | | | | |
|---|---|---|---|---|
| 3,454,360 A * | 7/1969 | Detweiler | ............... | C01B 17/76 423/522 |
| 3,862,247 A * | 1/1975 | Greco | ..................... | C07C 37/05 423/520 |

(Continued)

FOREIGN PATENT DOCUMENTS

| | | |
|---|---|---|
| CN | 103588179 A | 2/2014 |
| CN | 104495757 B | 9/2016 |

(Continued)

*Primary Examiner* — Stephen Hobson
(74) *Attorney, Agent, or Firm* — Chun-Ming Shih; HDLS IPR SERVICES

(57) ABSTRACT

The present invention provides a method for recycling sulfuric acid from various industries. The recovery system is constructed that it can process spent acid containing $H_2O_2$ and recover waste heat to save energy. The heat from the spent acid recovery process is used to generate electric energy, hot water, and chilled water to reduce its energy consumption, operating cost, and carbon emissions. This system can produce electronic-grade and industrial-grade sulfuric acid at the same time and solve the problem of spent acid disposal from various industries.

5 Claims, 4 Drawing Sheets

(56) References Cited

U.S. PATENT DOCUMENTS

| | | | | |
|---|---|---|---|---|
| 4,014,982 | A * | 3/1977 | Paull | C01B 17/78 |
| | | | | 423/523 |
| 4,081,515 | A * | 3/1978 | Gruhier | C01B 17/505 |
| | | | | 423/351 |
| 4,490,347 | A * | 12/1984 | Gelblum | C01B 17/50 |
| | | | | 423/521 |
| 4,576,813 | A * | 3/1986 | McAlister | C01B 17/765 |
| | | | | 423/532 |
| 4,670,242 | A * | 6/1987 | McAlister | C01B 17/7655 |
| | | | | 423/532 |
| 5,730,950 | A * | 3/1998 | Klotz | C01B 17/507 |
| | | | | 423/DIG. 2 |
| 6,174,510 | B1 * | 1/2001 | Riano | C01B 17/76 |
| | | | | 95/137 |
| 9,278,859 | B2 * | 3/2016 | Vera-Castaneda | C01B 17/74 |
| 10,351,427 | B2 * | 7/2019 | Dove | C01B 17/90 |
| 10,829,376 | B2 * | 11/2020 | Lykke | C01B 17/54 |
| 11,167,242 | B1 * | 11/2021 | Parker | C10L 3/103 |
| 2010/0068127 | A1 * | 3/2010 | Schoubye | C01B 17/775 |
| | | | | 423/522 |
| 2019/0170436 | A1 * | 6/2019 | De | F25J 3/062 |
| 2022/0169507 | A1 * | 6/2022 | Muller | C01B 17/7655 |
| 2024/0207772 | A1 * | 6/2024 | Kravets | B01D 45/04 |
| 2024/0279563 | A1 * | 8/2024 | Blaies | F01K 17/06 |

FOREIGN PATENT DOCUMENTS

| | | |
|---|---|---|
| CN | 105293449 B | 5/2018 |
| CN | 108483411 A | 9/2018 |
| TW | I481550 B | 4/2015 |
| TW | I585035 B | 6/2017 |
| TW | I646055 B | 1/2019 |
| TW | I757641 B | 3/2022 |

* cited by examiner

METHOD FOR RECYCLING ELECTRONIC-GRADE AND INDUSTRIAL-GRADE SULFURIC ACID

BACKGROUND OF THE INVENTION

Field of the Invention

The present invention discloses a method for recycling electronic-grade and industrial-grade sulfuric acid, wherein the spent sulfuric acid from chemical industry and semiconductor industry is recovered and manufactured by this process to produce electronic-grade and industrial-grade sulfuric acid.

The Prior Arts

The prior arts of spent sulfuric acid ($H_2SO_4$) disposal and removal in the semiconductor industry are as follows: 1. Neutralization: the spent sulfuric acid is disposed as waste water after being neutralized by alkali; 2. Reuse: the spent sulfuric acid is used as diluted industrial-grade sulfuric acid.

Taiwan Pat. Nos. I585,035B, a kind of spent acid recycling process, and I757,641B, electronic-grade ammonia water and sulfuric acid recycling manufacturing method, (hereinafter collectively referred to as the previous cases), which have been granted to the applicant, can recover the spent sulfuric acid produced by the semiconductor industry. After regeneration electronic-grade sulfuric acid is produced, which can be directly and effectively circulated in the semiconductor manufacturing process, so it shall reduce the huge demand for electronic-grade sulfuric acid in the industry and reduce the harm to the environment caused by the disposal of spent acid.

Although the process of the previous cases can convert spent acid into electronic-grade sulfuric acid, it is a pity that the process is limited to process spent acid from the semiconductor industry and cannot cope with spent acid generated by chemical industry. Spent acid recovery (SAR) should be able to regenerate spent acid from chemical industry, but its high energy cost makes it unfeasible financially.

Therefore, most spent acid from chemical industry is still disposed after neutralization. The spent acid recovery (SAR) plants designed to recover spent acid includes four major process steps: thermal decomposition, gas cooling and cleaning, catalytic sulfur dioxide/sulfur trioxide ($SO_2/SO_3$) conversion, and $SO_3$ absorption. Heat recovery from thermal decomposition, exothermic catalytic conversion and $SO_3$ absorption is typically in the form of high-pressure superheated steam, which is optimized based on site needs and economics, but the prior arts for heat recovery efficiency still has room for improvement.

U.S. Pat. No. 9,278,859B2 discloses a method for improving energy recovery from absorbing wet $SO_3$ in sulfuric acid in the manufacture of sulfuric acid. In U.S. Pat. Nos. 4,576,813 and 4,670,242, the heat transferred from the absorption acid produces intermediate-pressure steam that can be used to generate electricity and/or coordinate process operations. U.S. Pat. No. 5,118,490A describes an improved process for production of sulfuric acid from wet $SO_2$. U.S. Pat. No. 10,829,376B2 discloses a simpler sulfuric acid plant layout having a higher heat recovery rate to process different feedstocks comprising sulfur in any oxidation states. China Pat. No. 103,588,179A discloses a low-temperature exhaust heat system for a sulfuric acid recovering device to improve low-temperature waste heat recovery. China Pat. No. 104,495,757B discloses a low-temperature heat energy recovery system for $SO_3$ absorption in a sulfuric acid device, high-concentration sulfuric acid is atomized and fully contacts with the $SO_3$ process gas to generate high-temperature concentrated sulfuric acid.

In the manufacturing process of integrated circuits, photoresist stripping is an extremely major step. The most common chemical used for photoresist removal cleaning is sulfuric peroxide mixture (SPM) (sulfuric acid and hydrogen peroxide ($H_2O_2$) mixture). Mixing sulfuric acid and hydrogen peroxide produces peroxymonosulfuric acid ($H_2SO_5$), one of the strongest oxidants, that can easily remove the residual photoresist on wafer surface. The spent acid in the semiconductor industry usually contains 2 wt % to 6 wt % of residual $H_2O_2$, which is highly corrosive and oxidizing, and is easy to cause leakage of containers and pipelines, which is a potential safety hazard. Therefore, removal of $H_2O_2$ in spent acid is an urgent problem for those skilled in the art.

Taiwan Pat. No. I646,055 discloses a method and device for removing $H_2O_2$ in spent acid by applying a photocatalytic reaction with a liquid catalyst, its shortcoming is that the reaction time is long, and the residual metal catalyst is also a problem. Taiwan Pat. No. I481,550B and U.S. Pat. No. 10,351,427B disclose a method for manufacturing high-purity sulfuric acid.

Some spent acid recycling agents decompose the $H_2O_2$ by heating the spent acid in the presence of a catalyst. For example, China Pat. No. 105,293,449B discloses a method that sulfuric acid is recycled from spent acid from semiconductor cleaning process. China Pat. No. 108,483,411A discloses processing units for removing $H_2O_2$ in spent acid and a treatment method thereof, but it does not disclose the formula of the catalyst.

SUMMARY OF THE INVENTION

In order to solve these problems, the present invention provides a method for recycling electronic-grade and industrial-grade sulfuric acid, wherein the constructed recovery system can regenerate the spent acid containing $H_2O_2$ through an effective and continuous process as well as improve the efficiency of waste heat recovery to save energy, reduce carbon emissions, and operating cost.

The process of the present invention can solve the problem of removal and disposal of spent acid containing $H_2O_2$ produced by semiconductor industry, improve the heat recovery efficiency of spent acid recovery, and solve the financial feasibility of industrial-grade spent acid recovery. The energy cost of spent acid recovery from chemical industry can be shared with the energy cost of the spent acid recovery from the semiconductor industry, making the industrial-grade and electronic-grade sulfuric acid circulation possible and sustainable.

The present invention uses gold/silver bimetallic nanoparticles to catalyze the decomposition of $H_2O_2$ in spent acid under ultraviolet irradiation. Different from other metal nanoparticle-based catalyst systems in the prior arts, the present invention makes full use of the inertness of gold to sulfuric acid to improve the inertness, stability, and durability of silver nanoparticles in spent acid.

The spent acid after the gold/silver bimetallic nanoparticles catalytic treatment is then thermally decomposed to $SO_3$ and $H_2O$ in a decomposition furnace at 1000° C. to 1100° C., and $SO_3$ is further decomposed to $SO_2$. The hot process gases containing $SO_2$ from the decomposition furnace pass through heat exchanger (recuperator) to exchange heat with the combustion air that will enter the decomposition furnace. The combustion air is warmed up to 600° C. to 700° C. in the recuperator, which will reduce the fuel required for decomposition and achieve the purpose of energy saving and operating cost reduction.

After cooling in the recuperator, the $SO_2$-bearing gases pass through the waste heat boiler to generate high-pressure steam. The high-pressure steam passes through the turbine generator, and the cooled low-pressure steam passes through the organic Rankine cycle generator (ORC). The electrical energy generated by the turbine generator and the ORC generator is used to provide power for the second mixing tank and the third mixing tank, to save energy and operating cost, as well as reduce carbon emissions.

In additional to normal heat exchanger setup for spent acid recovery plants, an absorption chiller with a shell-and-tube heat exchanger that is designed to optimize the allover heat recovery efficiency as the fourth heat exchanger. The fourth heat exchange has a condenser, a generator, an evaporator, an absorber (lithium bromide mixed with water as the refrigerants), and a heat exchanger. It is linked to other heat exchangers, gas cooling tower, absorption towers, and product towers to fully utilize low-temperature waste heat to produce chilled water and electrical energy without consuming electricity, so it reduces the cost of electricity, hot water, heating, and cooling for the spent acid recovery.

Other objects and features will be apparent and described below.

DETAILED DESCRIPTION OF THE PREFERRED EMBODIMENT

In order to have a further understanding of the technical means and the operation process of the present invention, the following examples are given in conjunction with the drawings, and the detailed description is as follows.

Figure 1:
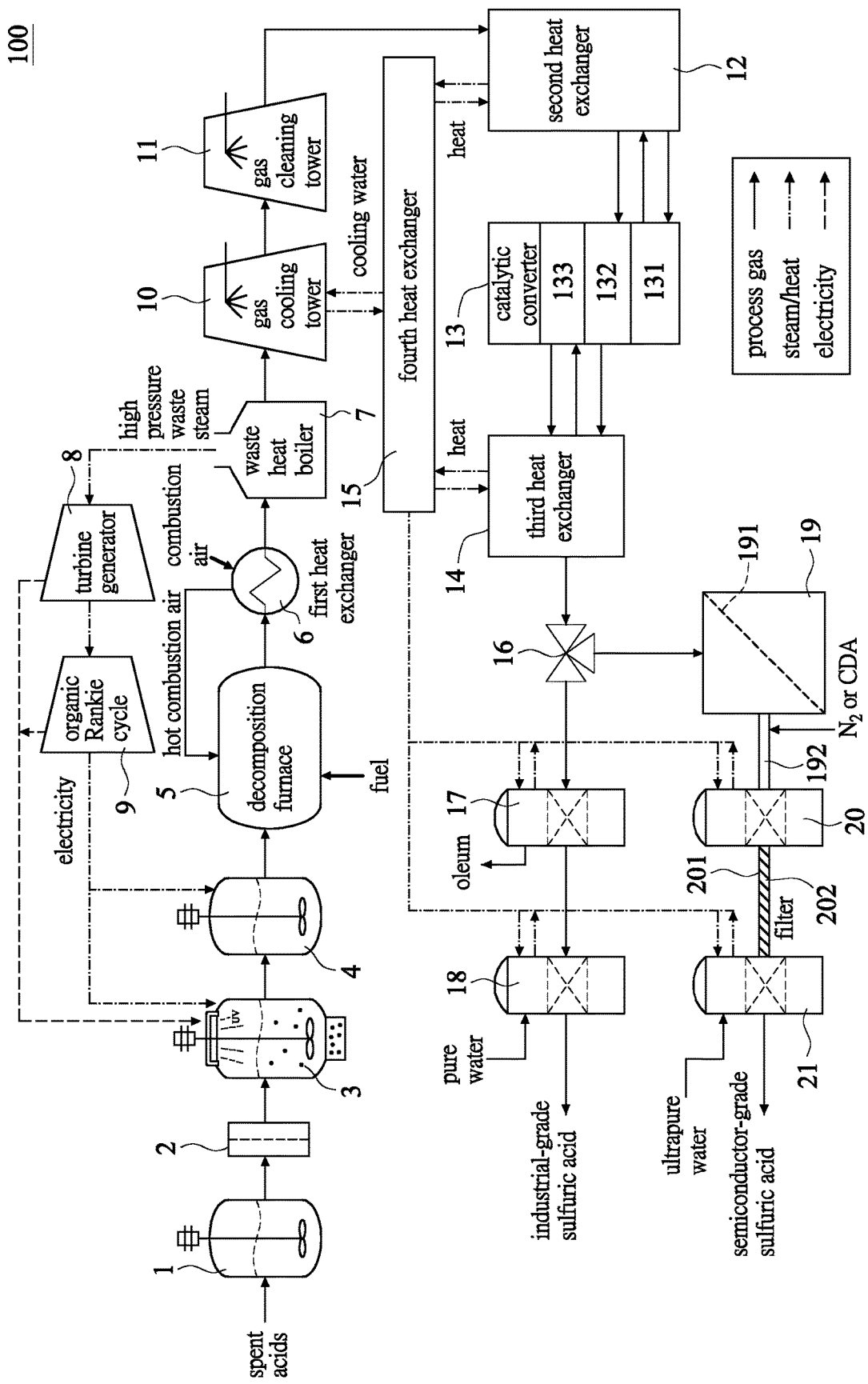
FIG. 1 is a schematic diagram of the spent acid recovery system of the present invention.
Figure 2:
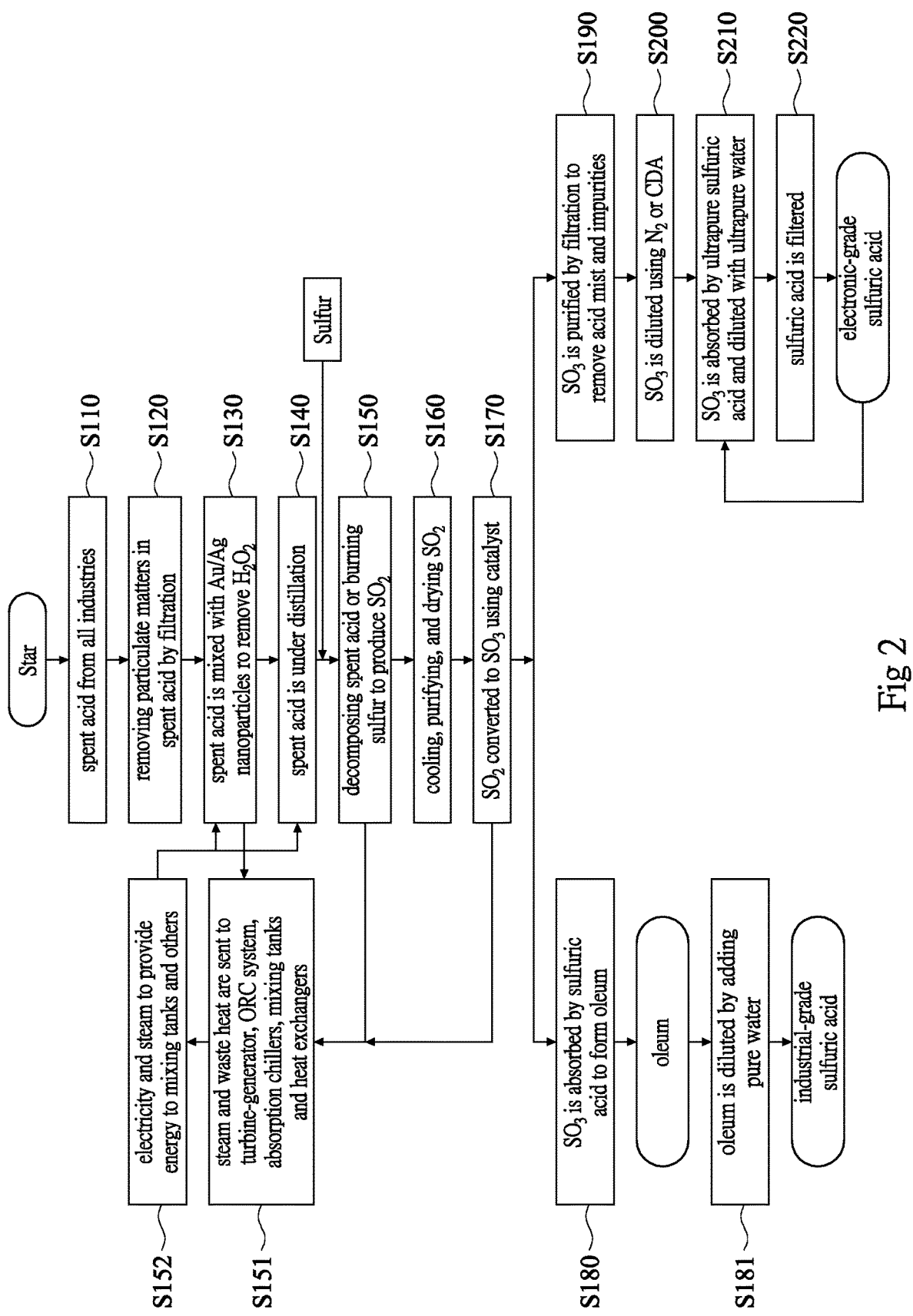
FIG. 2 is a flow chart of the method of the present invention.
Figure 3:
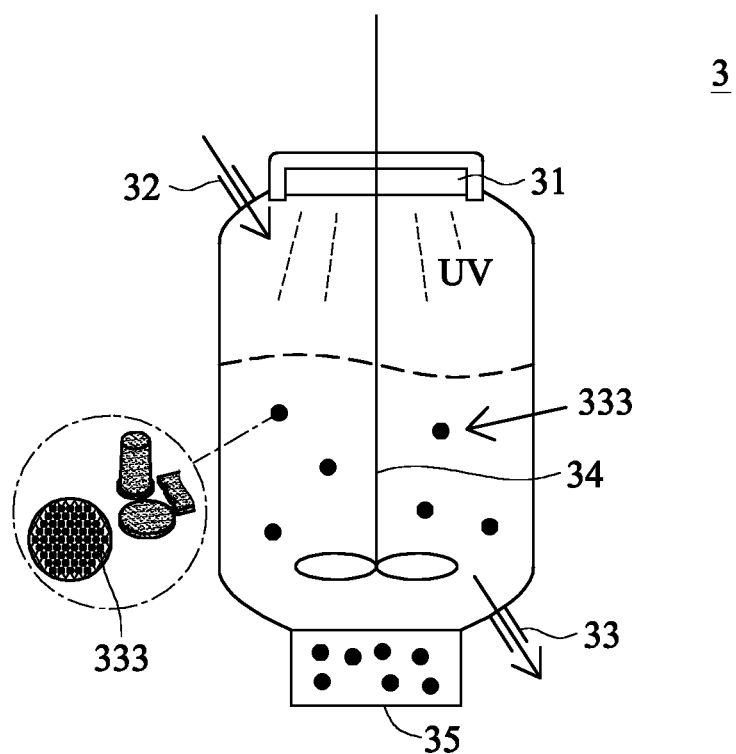
FIG. 3 is a schematic diagram of the second mixing tank for $H_2O_2$ removal of the present invention.
Figure 4:
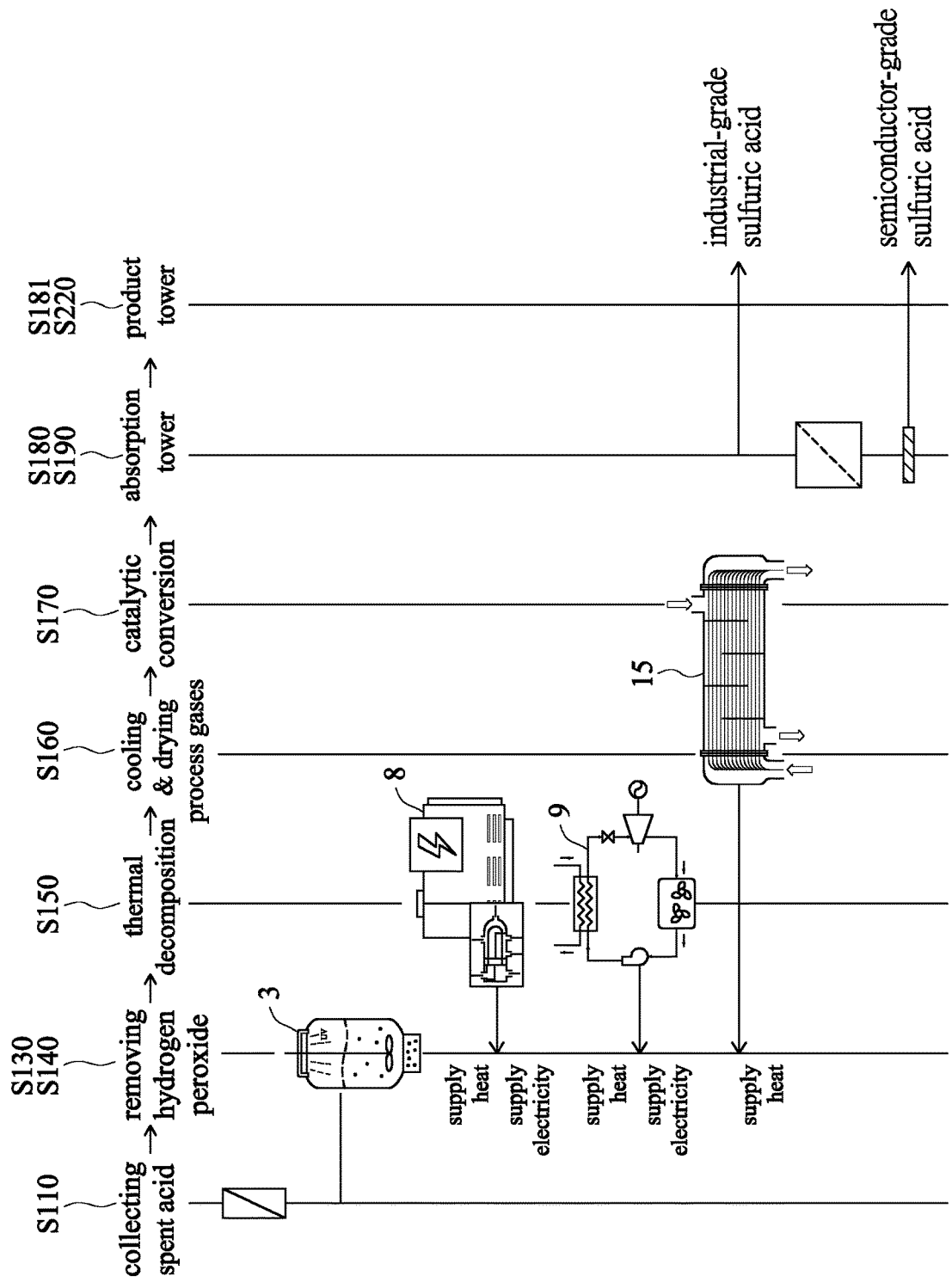
FIG. 4 is a schematic diagram of the spent acid recovery of the present invention.

Please refer to FIGS. 1 to 4, the present invention provides a $H_2O_2$ removing and energy-saving spent acid recovery system 100, which has the first mixing tank 1 connected to a second mixing tank 3 through a filter 2, and then connected to a third mixing tank 4 to produce concentrated clean spent acid without solid contents, followed by a decomposition furnace 5 to thermally decompose the spent acid, and then connected to the first heat exchanger 6 (recuperator) followed by a waste heat boiler 7 and a turbine generator 8 and an organic Rankine cycle generator 9 for heat recovery and electrical energy generation, and then connected to a gas cooling tower 10 and a gas cleaning tower 11 to produce clean process gas containing $SO_2$, and then connected to a converter 13 containing successive converter passes (131, 132, 133) containing catalyst $V_2O_5$ linked with the second heat exchanger 12, the third heat exchanger 14, and the fourth heat exchanger 15 to convert $SO_2$ to $SO_3$ with optimal reaction temperatures to maximize the conversion and heat recovery, A preferable embodiment is to reaction temperatures from 380° C. to 460° C. to improve the conversion and heat recovery, then connected to the first absorption tower 17, and then connected to a first product tower 18 to convert the pure $SO_3$ to industrial-grade sulfuric acid through the 3-way valve 16. The 3-way valve 16 is also connected to a demister 19 containing a PFA filter 191, to produce high-purity $SO_3$ without any liquid fractions (droplets) and impurities, and then connected with a second absorption tower 20 and a second product tower 21 to convert the high-purity $SO_3$ to electronic-grade sulfuric acid.

Wherein an ultraviolet radiator 31 is equipped at the high position of the second mixing tank 3, a spent acid inlet 32 is arranged at the high position of the second mixing tank 3, a spent acid outlet 33 is arranged at the lower position of the second mixing tank 3, a mixer 34 is arranged in the center of the second mixing tank 3, gold/silver bimetallic nanoparticle catalyst 333 is stored in the catalyst collection container 35 at the bottom of the second mixing tank 3, the fourth heat exchange 15 is an absorption chiller with a shell-and-tube heat exchanger; the 3-way valve 16 is constructed between the third heat exchanger 14 and the first absorption tower 17 and the second absorption tower 20 to direct the $SO_3$ to industrial-grade or electronic-grade sulfuric acid production; and perform the following processing steps:

Embodiment 1

In step S110, spent sulfuric acid from chemical industry and semiconductor industry is introduced into the first mixing tank 1 to obtain spent acid.

In step S120, the spent acid passes through the filter 2 and the residual solid impurities and particulate matters are removed, and the spent acid without solid impurities and particulate matters ($H_2SO_4$ 65 wt % and $H_2O_2$ 6 wt %) is transferred to the second mixing tank 3.

In step S130, starting the mixing so the gold/silver bimetallic nanoparticle catalyst 333 (core-shell nanoparticles consisting of a silver shell grown on gold nanoparticle cores, mole ratio of silver to gold=1~10%, a preferable embodiment is 6%, sintered on $SiO_2$ of particle sizes from 50 to 200 nm) can react with the $H_2O_2$ in the spent acid in the second mixing tank 3, the reaction is carried out at 60° C. to 120° C. and under UV radiation from the ultraviolet radiator 31 for 6 to 12 hours, until remaining $H_2O_2$ is less than 2 ppm. After $H_2O_2$ concentration is less than 2 ppm, the stirring is stopped and the gold/silver bimetallic nanoparticle catalyst 333 precipitates at the bottom of the second mixing tank 3 and then stored in the catalyst collection container 35 to be reused in the next spent acid treatment.

The present invention selects gold/silver bimetallic nanoparticles as the catalyst 333, and this nanoparticle catalyst is supported on an inert carrier by sintering or adsorption, the inert carrier can be silicon dioxide ($SiO_2$) or alumina ($\alpha$-$Al_2O_3$). In addition to lower reaction temperature and shorter reaction time, it also has the following novel and progressive advantages: 1. The cost of silver is lower than precious metal such as platinum, rhodium, palladium, and iridium, and silver is easier to obtain; 2. After $H_2O_2$ is removal, the gold/silver bimetallic nanoparticle catalyst 333 can be easily separated from the spent acid by gravity and then collected and stored in the catalyst collection container 35, which is beneficial to recycling; 3. The gold/silver bimetallic nanoparticle catalyst 333 can also be regenerated and reused by replenishing silver nanoparticles on its gold nanoparticle cores.

In step S140, the spent acid is transferred into the third mixing tank 4 and subjected to distillation (0.1 to 1 atm, 60° C. to 90° C.) to remove water content in the spent acid to increase its concentration (75 wt % to 80 wt %). The heating source is the hot water discharged from the organic Rankine cycle generator, and this concentrating step will save the fuel needed for the decomposition of spent acid in the decomposition furnace 5.

In step S150, this spent acid and sulfur, hot combustion air and fuel (liquid natural gas) are introduced into the decomposition furnace 5; the spent acid and sulfur are converted to $SO_3$ and $H_2O$ at 1000° C. to 1100° C., wherein $SO_3$ is further decomposed to $SO_2$ to obtain a process gas containing $SO_2$.

In step S151, the process gas containing $SO_2$ leaves the decomposition furnace 5 at 900° C. to 1100° C. and flows into the first heat exchanger (recuperator) 6 to exchange heat with the combustion air that will enter the decomposition furnace 5. The combustion air is heated up 600° C. to 700° C. when exiting the first heat exchange 6 and then flows to the decomposition furnace 5 as hot combustion air, this will reduce the fuel required for decomposition of spent acid. The process gas containing $SO_2$ is cooled down to 500° C. to 650° C. when leaving the first heat exchanger (recuperator) 6, then flows through the waste heat boiler 7 to generate high-pressure steam (40 barg and 450° C.), the high-pressure steam passes through the turbine generator 8 to generate electrical energy; and the resulting low-pressure steam (6 barg and 150° C.) passes through the organic Rankine cycle generator 9 to generate additional electrical energy.

In step S152, the electrical energy and hot water (70° C. to 90° C.) generated by the pressure steam through the turbine generator 8 and the organic Rankine cycle generator 9 are used for heating the second mixing tank 3, providing the power for the ultraviolet radiator 31, and increasing the concentrating the spent acid in the third mixing tank 4 in step S140, respectively;

In step S160, the process gas containing $SO_2$, after being cooled to 250° C. to 350° C., is further cooled down in the gas cooling tower 10 and then enters the gas cleaning tower 11 to remove ash particles, $SO_3$, acid mist, and $H_2O$ to produce dry process gas containing pure $SO_2$ (100° C. to 150° C.).

In step S170, $SO_2$ is converted to $SO_3$ in the converter 13 in the presence of catalyst ($V_2O_5$). Under the catalysis of $V_2O_5$, the gas containing $SO_2$ reacts with oxygen to form process gas containing $SO_3$. To maximize the $SO_2/SO_3$ conversion efficiency, the converter 13 has successive converter passes (131, 132, 133) containing catalyst $V_2O_5$ and is connected with multiple heat changers (12, 14, 15). The heat exchangers are used for maintaining optimal conversion temperature as cooled gas is favored for this exothermic $SO_2/SO_3$ conversion. The preferable embodiment of conversion temperature (from 380° C. to 460° C.). Partial cooling between the converter passes reestablishes the conversion capability for the catalyst of the next pass. The heat exchangers also improve the heat recovery in this spent acid recovery.

The dry gas containing pure $SO_2$ flows through the second heat exchange 12 to bring it to the catalyst operating temperature (380° C. to 420° C.) before it contacts $V_2O_5$ in the first converter pass, 131. The gas containing pure $SO_2$ is partially converted in the first converter pass 131 to gas containing $SO_2$ and $SO_3$. The conversion of $SO_2$ to $SO_3$ is highly exothermic and increases the gas temperature to 500° C. to 650° C. The second heat exchanger 12 cools the partially converted gas leaving the first converter pass 131 to 420° C. to 460° C. Heat generated by the exothermic conversion is recovered and used in the second heat exchangers 12 to bring the process gas from the gas cleaning tower 11 to its optimal operating temperature (380° C. to 420° C.). The cooled gas containing $SO_2$ and $SO_3$ (420° C. to 460° C.) flows to the second converter pass 132 where further conversion of $SO_2$ to $SO_3$ occurs, generating additional heat. The process gas temperature is raised to 500° C. to 650° C. when leaving the second converter pass 132 and flows to the third heat exchange 15 to cool to desired operating temperature (420° C. to 460° C.) and optimizes the heat recovery. The processed gas then flows into the third converter pass 133 to convert the remaining $SO_2$ to $SO_3$. The process gas leaving the third converter pass 133 flows through the third heat exchanger 14 to be cooled to between 100° C. to 120° C.

In step S180, the process gas containing pure $SO_3$ passes into the first absorption tower 17, where $SO_3$ is absorbed by the existing sulfuric acid in the first absorption tower 17 at 80° C. to 100° C., to obtain 35% oleum (108% strength sulfuric acid). The temperature of the sulfuric acid in the first absorption towers 17 increases due to heat transfer from the process gas and absorption of $SO_3$. The absorption heat is removed by cooling water from the fourth heat exchanger 15 to maintain optimum acid temperatures and energy recovery.

In step S181, the 35% oleum is introduced into the first product tower 18 and is mixed with pure water (1 wt % to 10 wt %) to obtain industrial-grade sulfuric acid (93 wt % to 98 wt %). The heat of mixing and dilution is also recovered by the fourth heat exchanger 15.

Embodiment 2

Steps S110 to S170 are performed as above to recovery industrial-grade sulfuric acid, and then the following additional steps are performed to recovery electronic-grade sulfuric acid:

In step S190, the process gas containing pure $SO_3$ from the 3-way valve 16, passes through the demister 19, using perfluoroalkoxy-alkanes (PFA) as its inner lining, with the PFA filter 191, to remove any sulfuric acid traces and any solid particles still existing and to produce high-purity $SO_3$ without any liquid fractions (droplets) and impurities.

In step S200, ultrapure nitrogen ($N_2$) or clean dry air (CDA) (1 vol % to 50 vol %) is mixed with the high-purity $SO_3$ in a PFA gas pass 192 to dilute the high-purity $SO_3$, and this dilution helps reduce the $SO_2$ still present in the high-purity $SO_3$. It will reduce the possibility of $SO_2$ being absorbed by high-purity dilute sulfuric acid in the subsequent process.

In step S210, the high-purity $SO_3$ is then passed into the second absorption tower 20, a reactor lined with PFA, containing high-purity diluted sulfuric acid, and $SO_3$ is absorbed by high-purity diluted sulfuric acid at 80° C. to 100° C. to produce high-purity sulfuric acid.

In step S220, the high-purity sulfuric acid passed through a PFA filtration pass 202 with a PFA filtration membrane 201 to remove residual solid impurities to obtain electronic-grade sulfuric acid. The electronic-grade sulfuric acid is introduced into the second product tower 21 with PFA inner lining, to adjust its concentration to meet the concentration required by the semiconductor industry process (96 wt % to 98 wt %) using ultrapure deionized water (1 wt % to 10 wt %), the heat of mixing and dilution is also recovered by the fourth heat exchanger.

The above recovery system and process of the present invention have novelty: 1. the $H_2O_2$ in spent acid can be removed by the gold/silver bimetallic nanoparticle catalyst faster with low reaction temperature. 2. The gold/silver bimetallic nanoparticle catalyst is easily to produce with less cost, and it also can be regenerated and reused by replenishing silver nanoparticles on its gold nanoparticle cores. 3. The sensible and latent heat generated by thermal decomposition of the spent acid, $SO_2/SO_3$ conversion, and $SO_3$ absorption, and sulfuric acid dilution is recovered by the heat exchanger units.

The steam obtained from spent acid recovery generates electrical energy for use in the process, and hot water from spent acid recovery can also be used as necessary in the process. In addition to generating high-pressure steam from the process gas to generate electricity through the turbine generator 8, the organic Rankine cycle generator 9 also generates electricity from the low-pressure steam for use in the process. The depressurized hot water is also designed to meet the heating needs of spend acid concentration in the process. The fourth heat exchanger 15 is an absorption chiller with a shell-and-tube heat exchanger that is designed to optimize the allover heat recovery efficiency. The fourth heat exchanger 15 has a condenser, a generator, an evaporator, an absorber (lithium bromide mixed with water as the refrigerants), and a heat exchanger unit. A high thermal efficiency absorption chiller with a shell-and-tube heat exchanger is integrated and connected with waste heat sources and heat exchangers to improve the overall heat exchange efficiency and to reduce the energy consumption, carbon emissions, and product cost for the spent acid regeneration significantly by fully utilizing the low-pressure steam and hot water that normally not used. According to [Embodiment 1] of the present invention, the residual $H_2O_2$ in the spent acid can be effectively removed to regenerate industrial-grade sulfuric acid, and the heat recovery efficiency increases by up to 14%. According to [Embodiment 2] of the present invention, the residual $H_2O_2$ in the spent acid can be effectively removed to regenerate electronic-grade sulfuric acid, and the heat recovery efficiency increases by up to 10%.

What is claimed is:

1. A method for recycling electronic-grade and industrial-grade sulfuric acid, comprising:

constructing a H2O2 removing and energy-saving spent acid recovery system, which has a first mixing tank connected to a second mixing tank through a filter and then connected to a third mixing tank to produce concentrated clean spent acid, followed by a decomposition furnace to thermally decompose spent acid, and then connected to a first heat exchanger followed by a waste heat boiler and a turbine generator and an organic Rankine cycle generator for heat recovery and electrical energy generation, and then connected to a gas cooling tower and a gas cleaning tower to produce clean process gas containing SO2, and then connected to a converter containing successive converter passes, containing catalyst V2O5, which linked with a second heat exchanger, a third heat exchanger, and a fourth heat exchanger to convert SO2 to SO3 to reaction temperatures from 380° C. to 460° C. to improve the conversion and heat recovery, then connected to a first absorption tower, and then connected to a first product tower to convert the pure S03 to industrial-grade sulfuric acid, a 3-way valve is connected to a demister containing a PFA filter, to produce high-purity SO3 without any liquid fractions and impurities, and then connected with a second absorption tower and a second product tower to convert the high-purity SO3 to electronic-grade sulfuric acid;

wherein the fourth heat exchanger is arranged between the second heat exchanger, the third heat exchanger, and the gas cooling tower, absorption towers, and product towers, which is an absorption chiller with a shell-and-tube heat exchanger; an ultraviolet radiator is arranged above the second mixing tank, a spent acid inlet is arranged at the high position of the second mixing tank, a spent acid outlet is arranged at the lower position of the second mixing tank, a mixer is arranged in the center of the second mixing tank, a gold/silver bimetallic nanoparticle catalyst is arranged in the second mixing tank, a catalyst collection container is arranged at the bottom of the second mixing tank, and perform the following processing steps:

step S110, industrial-grade spent acid and electronic-grade spent acid to from various industries are introduced into the first mixing tank to obtain spent acid;

step S120, then the spent acid passes through the filter and the residual solid impurities and particulate matters are removed, and the spent acid without solid impurities and particulate matters is transferred to the second mixing tank;

step S130, mixing the gold/silver bimetallic nanoparticle catalyst with the spent acid in the second mixing tank at 60° C. to 120° C., in the presence of UV light by the ultraviolet radiator for 6 to 12 hours, until the residual H2O2 in the spent acid is less than 2 ppm;

step S140, transferring the spent acid into the third mixing tank, carrying out distillation to remove the water content from spent acid (0.1 to 1 atm, 60° C. to 100° C.), to obtain a concentrated spent acid (75 wt % to 80 wt %);

step S150, the spent acid and sulfur, hot combustion air and fuel are fed into the decomposition furnace; then the spent acid and sulfur are thermally converted to S03 and H2O at 1000° C. to 1100° C., wherein S03 is further decomposed into SO2 to obtain a processed gas containing SO2;

step S151, the process gas containing SO2 leaves the decomposition furnace at 900° C. to 1100° C., flows into the first heat exchanger to exchange heat with the combustion air that will enter the decomposition furnace to obtain a hot combustion air and the process gas containing SO2 cooled down at 500° C. to 650° C., and then the process gas containing SO2 leaves the first heat exchanger, then passes through the waste heat boiler to generate a high-pressure steam (40 barg and 450° C.), the high-pressure steam passes through the turbine generator to generate electrical energy; and the resulting cooled low-pressure steam (6 barg and 150° C.) passes through the organic Rankine cycle generator to generate electrical energy;

step S152, the electrical energy generated by pressure steam passing the turbine generator and the organic Rankine cycle generator is used in step S130, heating the second mixing tank and the ultraviolet radiator and step S140, increasing the spent acid concentration in the third mixing tank;

step S160, the process gas containing SO2 after being cooled to 250° C. to 350° C. flows into the gas cooling tower and the gas cleaning tower, to further cool down, and remove ash particles, S03, acid mist and water, to produce drying process gas containing pure SO2 at 100° C. to 150° C.;

step S170, under the catalysis of V2O5, the gas containing SO2 reacts with oxygen to form SO3 and becomes process gas containing SO2 and SO3 in the converter, to maximize the SO2/SO3 conversion efficiency, the converter has successive converter passes and is connected with multiple heat changers, the heat exchangers are used for maintaining conversion temperature (from 380° C. to 460° C.) and improve the heat recovery in this spent acid recovery;

the dry gas containing pure SO2 flows through the second heat exchange to bring it to the catalyst operating temperature (380° C. to 420° C.) before it contacts V205 in a first converter pass, the gas containing pure SO2 is partially converted to the gas containing SO2 and SO3 in the first converter, the conversion of SO2 to SO3 is highly exothermic and increases the gas temperature to 500° C. to 650° C.;

the second heat exchanger cools the partially converted gas leaving the first converter pass to 420° C. to 460° C., heat generated by the conversion is recovered and used in the second heat exchanger to bring the gas from the gas cleaning tower to the first converter pass to its optimal operating temperature (380° C. to 420° C.), the cooled gas containing SO2 and S03 (420° C. to 460° C.) flows to a second converter pass where further conversion of SO2 to SO3 occurs, generating additional heat, the process gas temperature is raised to 500° C. to 650° C. when leaving the second converter pass and flows to the third heat exchange to cool to desired operating temperature (420° C. to 460° C.) and optimizes heat recovery, the process gas then flows into a third converter pass to convert the remaining SO2 to SO3, the process gas leaving the third converter pass flows through the third heat exchanger to be cooled to 100° C. to 120° C.;

in step S180, the process gas containing pure S03 passes into the first absorption tower, where SO3 is absorbed by the existing sulfuric acid in the first absorption tower at 80° C. to 100° C., to obtain 35% oleum (108% strength sulfuric acid), the temperature of the sulfuric acid in the first absorption towers increases due to heat transfer from the process gas and absorption of S03, the absorption heat is removed by cooling water produced by the fourth heat exchanger to maintain optimum acid temperatures and energy recovery; and in step S181, the 35% oleum is introduced into the first product tower and is mixed with pure water (1 wt % to 10 wt %) to obtain industrial-grade sulfuric acid (93 wt % to 98 wt %), the heat of mixing and dilution is also recovered by the fourth heat exchanger.

2. The method for recycling electronic-grade and industrial-grade sulfuric acid as described in claim 1, wherein further step S190 is performed after step S170, after being cooled to 1000 C to 120° C. in the third heat exchanger, process gas containing pure SO3 is introduced into a demister with the PFA filter via the 3-way valve, to produce high-purity SO3 without any liquid fractions and impurities after the removal of the sulfuric acid traces, solid impurities, and solid particles;

step S200, mixing ultrapure nitrogen (N2) or clean dry air (CDA) (1 vol % to 50 vol %) with the high-purity SO3 in a PFA gas pass to dilute SO2 content in the high-purity SO3 to reduce the possibility of SO2 being absorbed by high-purity dilute sulfuric acid in the subsequent processes;

step S210, the high-purity S03 is then transferred into the second absorption tower, a reactor lined with PFA, containing high-purity diluted sulfuric acid, and S03 is absorbed by high-purity diluted sulfuric acid at 80° C. and 1000 C to produce high-purity sulfuric acid, the absorption heat is removed by cooling water produced by the fourth heat exchanger to maintain optimum acid temperatures and energy recovery; and step 220, the high-purity sulfuric acid is then transferred through a PFA filtration pass containing a PFA filtration membrane to remove any residual solid impurities, then electronic-grade sulfuric acid is obtained, and the electronic-grade sulfuric acid is introduced into the second product tower, the concentration of the electronic-grade sulfuric acid is adjusted through ultrapure deionized water (1 wt % to 10 wt %) in the second product tower to produce the electronic-grade sulfuric acid with the concentration required by the semiconductor industry process (96 wt % to 98 wt %), the heat of mixing and dilution is also recovered by the fourth heat exchanger.

3. The method for recycling electronic-grade and industrial-grade sulfuric acid as described in claim 1, wherein step S130, after $H_2O_2$ in spent acid is removed, the gold/silver bimetallic nanoparticle catalyst precipitates into the catalyst collection container at the bottom of the second mixing tank to be used for the next $H_2O_2$ removal.

4. The method for recycling electronic-grade and industrial-grade sulfuric acid as described in claim 3, wherein the gold/silver nanoparticle catalyst is a nanoparticle silver shell grown on nanoparticle gold core supported on an inert carrier by sintering or adsorption, wherein nanoparticle silver is ratio of 1-10 mol % and the inert carrier can be silica or alumina.

5. The method for recycling electronic-grade and industrial-grade sulfuric acid as described in claim 4, wherein the gold/silver bimetallic nanoparticle catalyst can be regenerated and reused by replenishing silver nanoparticles on their gold nanoparticle core surface.

* * * * *